3,455,696
FEED SUPPLEMENT FOR ANIMALS AND PRODUCTION THEREOF
Tomizo Ukita, Kyoto, Masashi Nakai, Itami, Zenro Minami, Toyonaka, and Toshio Yamazaki and Koda Ootaka, Ibaraki, Japan, assignors to Nagase & Co., Ltd., Osaka, Japan
No Drawing. Filed Nov. 8, 1965, Ser. No. 506,884
Int. Cl. A23k 1/16
U.S Cl. 99—9           10 Claims

ABSTRACT OF THE DISCLOSURE

In producing an animal feed supplement wherein a microorganism selected from the group consisting of *Bacillus subtilis* and *Bacillus natto* is cultivated in a culture medium, the improvement of enhancing the growth-promoting activity thereof by stopping the cultivation at a point between the beginning and middle of the logarithmic growth phase of the microorganism, and heating the resulting culture at a pH of 4.0 to 8.0 at a temperature of 50 to 80° C. for 1 to 3 hours. The invention also includes an animal feed supplement produced by the above-described process and an animal feed containing said feed supplement.

---

This invention relates to a novel feed supplement for animals and also to a process for producing the same. This invention also relates to an animal feed to which such supplement is added.

It has recently come to be conventional to add such nutrients as vitamins, amino acids, antibiotics, enzymes or disease preventives to feeds for animals. In view of the present status of the world-wide development of the livestock raising industry, the development of an effective feed supplement would amount to a significant contribution to the art.

The present invention relates to the preparation of a feed supplement for animals characterized by cultivating a microorganism belonging to *Bacillus subtilis* or *Bacillus natto* preferably by submerged cultivation with vigorous agitation and aeration, stopping the cultivation between the beginning and middle of the logarithmic growth phase of the microorganism and then heat-treating the culture broth under particular conditions so that there may be produced, at a high yield, a highly effective feed supplement which is stable and is useful as an additive for feeds for poultry and animals.

We have found, through extensive research on the effect of fermentation products of microorganisms on animal feeds, that the effect as a feed supplement of the culture product of a microorganism belonging to *Bacillus subtilis* or *Bacillus natto* is not stable and varies depending on the particular method employed for preparing the same. Thus, in some cases, no effect has been observed; in others, a result amounting to the inhibition of the growth of animals has been often observed.

As a result of further investigations and research from various angles in view of these observations, we have discovered that it is important to stop the cultivation at a particular stage as described before and to heat-treat the resulting cultivation product or broth under pecific conditions. For example, we have found that, in the case of conventional organisms of *Bacillus subtilis* (known as *Bacillus subtilis* N' strain) widely used in the production of amylase and protease, a substance which will promote or stimulate the growth of animals when administered to them will be produced in the culture solution and cells within a period far earlier than that period when such enzyme as amylase or protease and antibiotics begin to be accumulated in a large amount. We have further found that, when the cultivation is continued until the growth of the microorganism goes into the latter part of the period of the logarithmic growth phase, the production of the enzyme will still continue but, on the other hand, a factor acting to inhibit the growth of animals will also be produced in the culture solution. That is to say, in the period from the beginning to the middle of the logarithmic growth phase of bacteria, a factor or substance effective for the promotion of the growth of animals will be produced and accumulated both inside and outside the cells (that is, in the culture filtrate); while the production of the factor inhibiting the growth of animals will be negligible.

We have also discovered that, when the culture solution or broth containing the cells obtained in this particular period is heated under selected conditions, the activity of the product to promote the growth of animals will increase.

Microorganisms which are used in carrying out the present invention are those belonging to *Bacillus subtilis* and *Bacillus natto*. As is well known, in the strains belonging to these groups are included such strains producing amylase and protease in a large amount and used industrially as, for example, a *Bacillus subtilis* N strain (Hagihara, 1958), N' strain (Boyer et al., 1960), R strain (Hagihara, 1958), K strain (Oishi et al., 1963), H strain (Nishimura et al., 1959) and *Bacillus natto* Sawamura strain and SN strain. Also included are strains producing the above mentioned enzymes only in slight amounts and used often for genetic research as, for example, Marburg strains No. SB–15 (Nester et al., 1961), No. 160 (Saito et al., 1961), No. 168 (Burkholder et al., 1947), No. 30 (Ephrati-Elizur et al., 1961) and No. W 23 (Thorne, 1962). These strains are well known to those skilled in the art and are easily available from various public culture collections.

According to the present invention, the above described microorganisms are cultivated. Either a solid culture process or submerged culture process with agitation and aeration may be employed. However, the submerged culture process is most preferred due to the fact that various conditions required in carrying out the present invention can be controlled easily and positively.

Any culture medium which is well known in the cultivation of microorganisms of *Bacillus subtilis* and *Bacillus natto* may be employed. For the carbon source can be used starch, corn meal, dextrin, glucose and sucrose. For the nitrogen source can be utilized not only such inorganic nitrogen sources as ammonium chloride $NH_4Cl$, ammonium sulfate $(NH_4)_2SO_4$, ammonium phosphate $(NH_4)_2HPO_4$ and ammonium nitrate $NH_4NO_3$ but also such beans as soybeans and corn steep liquor, defatted powdered milk, casein and amino acids. Inorganic nutrient sources are also required, for example, $K_2HPO_4$ and other auxiliary salts. Industrially preferable is a culture medium consisting of a proper combination of 3 to 20% alkali extract of defatted soybean, 0.5 to 10% corn steep liquor, 1 to 10% starch, 1 to 8% corn meal, 1 to 5% rice bran and 1 to 5% bran with the addition of a small amount of nutrient inorganic salts.

The starting pH of the culture medium is 6.0 to 8.0 or preferably 6.5 to 7.2. The temperature may be 30 to 40° C. or preferably 35 to 38° C.

The culture age is very important to the practice of the invention as mentioned before. Generally the time of the shift from one growth phase to the next one will be remarkably influenced by the particular strain, condition of the preculture, size of the inoculum, rate of aeration, agitation, medium, pH and temperature. However, for the strains that are used in the present invention, if the other conditions are the same, the time of the growth phase shift will show substantially the same trend. Therefore, the invention will be illustrated by taking, as an example, those strains of Bacillus subtilis used for the industrial production of amylase and protease. Under the typical culture conditions shown in Example 1, in 1.5 to 2 hours after the inoculation, the logarithmic growth phase will begin, and after about the 6th hour, the latter part of the logarithmic growth phase will begin, and thereafter the stationary phase will set in. It is usual that the production of such extracellular enzymes and antibiotics as amylase and protease will still continue even in the stationary phase. However, according to the present invention, as described above, in order to obtain a cultivation product which is useful as a feed supplement for animals, the cultivation must be stopped between the beginning and middle of the logarithmic growth phase of the bacteria, that is to say, between about 2 and 4 hours after the inoculation in this particular example.

We have discovered that, when the cultivation product or broth is used is such or as drum-dried or spray-dried, it will have no substantial effect as a supplement for animal feeds. However, when it is heated under selected conditions and is then dried, its effect will remarkably be increased. That is to say, the cultivation is stopped at the above described particular age, and then the pH of the medium is adjusted to 4.0 to 8.0 as required. The culture product is heated to 50 to 80° C. for 1-3 hours. It is preferable to conduct this heat treatment at a temperature of 55-75° C. for 1-2 hours.

In case this heat-treated product or culture broth is centrifugally separated into a liquid and an insoluble solid. The effective constituent will be seen in both portions. Therefore, it is not absolutely necessary to separate them from each other. Therefore, the heat-treated product is absorbed on the animal feed as such or after concentration. If desired the heat-treated culture product or broth may be dried by a drum dryer or spray dryer without being absorbed in a solid feed or the like. The drying temperature of the product is preferably 50 to 80° C.

The feed supplement obtained by the present process can be used as a supplement for conventional feeds used for hens, pigs, rats and cows and other poultry and animals.

The amount of the supplement or additive of the invention to be added to animal feed varies depending on the form (liquid, concentrate or dried powder) and object of the same, but it can be used generally in the range of 0.02 to 1% (as solid) by weight based on the basal feed.

For example, it can be used in the range of 0.02 to 0.05% for the increase of the percentages of weight gain and feed conversion of poultry, 0.02 to 0.1% for the increase of the percentage of egg production, 0.02 to 0.1% for the increase of the percentage of weight gain of cows and pigs, 0.05 to 0.2% for the increase of the milking percentage and 0.1 to 0.5% for the increase of taste.

Example 1

A culture medium (1000 liters) having a pH of 7.0 containing 5% alkali extract of defatted soybeans, 4% starch, 2% lactose, 1% corn steep liquor and 1% $(NH_4)_2HPO_4$ was charged in a cultivation tank (main tank) having a capacity of 2000 liters.

A Bacillus subtilis N' strain as cultured at 37° C. for 5 hours with 50 liters of the same culture medium as is mentioned above under agitation and aeration in a seed tank of a capacity of 100 liters was used as an inoculum.

The cultivation in the main tank was carried out with agitation of an impeller at 190 r.p.m. and by introducing 1000 liters of sterilized air per minute, at 37° C. The dimension of the impeller was as follows:

$$\frac{\text{Length of the impeller}}{\text{Diameter of the tank}} = 0.7$$

$$\frac{\text{Width of the impeller}}{\text{Diameter of the tank}} = 0.08$$

The cultivation was carried out by agitation and aeration as mentioned above for 4 hours, at the end of which time 150 liters of the resulting broth were taken for each sample.

The samples (used in test pens 1 to 13 in the following Table 1) were prepared by heating the cultivation product (broth) to 55 to 100° C., for 1 to 3 hours and then drying with a drum dryer. The samples used in a test pen 14 was prepared by heating the same culture broth at 45° C. for 2 hours after stopping the cultivation and by drying it with a drum dryer. The samples were respectively added to basal feeds and were used in feeding tests for 100 Rockhorn $F_1$ (♂) chicks (one day old) per pen for 5 weeks. The results are shown in Table 1. In each case, the amount of the addition of the dried product was 0.03% by weight based on the basal feed. The basal feed was a conventional one consisting mostly of corn, defatted soybean meal and fish meal, having 980 Cal./lb. of productive energy, and containing 22% crude protein (CP), 8% fish meal, 3% alfalfa meal, 20 gr./t. of an antibiotic and 0.01% furazolidone, which is a reasonable and ideal mixture for the nutrition of poultry and contains all the usual growth factors.

TABLE 1.—RELATION BETWEEN THE HEAT-TREATING CONDITIONS AND THE PERCENTAGES OF WEIGHT GAINS OF CHICKS

| | Heat treatment | | Percentage of the weight gain in percent |
|---|---|---|---|
| | Temperature (° C.) | Time (hour) | |
| Pen Number: | | | |
| 1 | 55 | 1 | 103.5 |
| 2 | 55 | 2 | 104.2 |
| 3 | 55 | 3 | 105.1 |
| 4 | 60 | 1 | 106.1 |
| 5 | 60 | 2 | 107.0 |
| 6 | 60 | 3 | 106.8 |
| 7 | 70 | 1 | 105.8 |
| 8 | 70 | 2 | 105.6 |
| 9 | 70 | 3 | 105.5 |
| 10 | 80 | 1 | 105.0 |
| 11 | 80 | 2 | 104.8 |
| 12 | 80 | 3 | 104.3 |
| 13 | 100 | 1 | 104.4 |
| 14 | 45 | 2 | 101.2 |
| Control | | | 100 |

Example 2

A Bacillus subtilis K strain was cultivated with an aeration of 250 liters/min. under agitation at 37° C. by using 250 liters of the same culture medium as in Example 1 in a culturing tank of a capacity of 500 liters. The cultivation was continued for 3 hours, at the end of which time the temperature was elevated to 60° C.

The broth or culture product was kept at that temperature for 2 hours, was then mixed and absorbed in 250 kg. of bran, and air-dried at 45° C. to a powder. A test feed was prepared by adding 1% of this powder to the basal feed mentioned below. 10 albino rats 3 weeks old were raised for tests. The results are shown in Table 2.

Composition of the basal feed:

| | Percent |
|---|---|
| Defatted soybean meal | 20 |
| Cod-liver oil | 1 |
| Bran | 20 |
| Corn | 55 |
| $CaHPO_4$ | 1 |
| Vitamin B agent | 0.1 |
| Mineral agent | 0.1 |

Composition of the basal feed:

| | Percent |
|---|---|
| NaCl | 0.5 |
| McCollam's salt mixture | 2.0 |
| Methionine | 0.2 |
| B₁₂ agent | 0.1 |

TABLE 2.—EFFECTS ON THE WEIGHT GAIN OF RATS

| | | ♂ | | ♀ | |
|---|---|---|---|---|---|
| Pen No. | Feed | Weight gain (g.) | Weight gain (percent) | Weight gain (g.) | Weight gain (percent) |
| 1 (Control) | Basal feed | 160.7 | 100 | 85.0 | 100 |
| 2 | Basal feed+1% supplement | 180.0 | 112 | 129.3 | 152.1 |

Example 3

A *Bacillus subtilis* N' strain was cultivated in the same manner as in Example 1. 50 liters of the culture broth were taken out at the second hour when the logarithmic growth phase sets in; the fourth hour which was the middle of the logarithmic growth phase; the sixth hour which was the latter part of the logarithmic growth phase; the tenth hour when the stationary phase sets in and the sixteenth hour, and were heated at 60° C. for 2 hours. The heat treated broth was absorbed in 50 kg. of bran and air-dried at 45° C. and crushed to be an animal feed supplement. When Rockhorn $F_1$ ($\male$) chicks one day old were raised for tests for 8 weeks with the same basal feed as in Example 1, it was found that the effect of the increase of the percentage of weight gain was remarkable with feed supplements obtained from the culture broth taken at or before the middle of the logarithmic growth phase; but that there was an action of inhibiting the growth of animals with those obtained from the culture broth taken thereafter. In this case, the basal feed used after the 5th week was of a productive energy of 1200 Cal./lb. and of 2% crude protein content. The addition of the feed supplement was 0.5% by weight based on the basal feed. The results are shown in Table 3.

Example 4

A *Bacillus subtilis* Marburg No. 160 strain was cultured in the same manner as in Example 1 for 4 hours, at the end of which time the broth was heated to 70° C. at a pH of 7.0 and was kept at that temperature for 2 hours. This heat-treated broth was very low in both amylase and protease activities. It was dried with a spray dryer to a powder. 0.05% by weight of the powder was added to the same basal feed as in Example 3 for a test wherein 100 Rockhorn F1 ($\male$) chicks one day old were raised for tests in each of the pens. The results are shown in Table 4.

TABLE 4

| Weeks | Pens | Average weight (g.) | Weight gain (percent) | Feed conversion |
|---|---|---|---|---|
| Start | Test pen | 34.4 | | |
| | Control pen | 34.4 | | |
| 2 | Test pen | 136.2 | 102.9 | 1.84 |
| | Control pen | 133.2 | 100 | 1.87 |
| 4 | Test pen | 341.4 | 104.8 | 1.90 |
| | Control pen | 327.1 | 100 | 2.00 |
| 6 | Test pen | 616.8 | 106.1 | 2.50 |
| | Control pen | 583.0 | 100 | 2.57 |
| 8 | Test pen | 989.4 | 107.3 | 2.75 |
| | Control pen | 924.6 | 100 | 2.81 |

Example 5

A *Bacillus subtilis* N strain was cultured in the same manner as in Example 1 for 4 hours, at the end of which time the broth was heated at 60° C. for 2 hours. The heat-treated broth was then dried with a spray dryer to a powder. 0.1, 0.05 and 0.025% by weight of the powder was added to the basal feed for testing. Chicks one day old were raised for broilers as tests in each pen for 8 weeks.

TABLE 3.—EFFECTS OF RAISING WITH SUPPLEMENTS PREPARED AT DIFFERENT CULTURE AGES

| | | Weight gain (percent) | | | | Feed conversion | | | |
|---|---|---|---|---|---|---|---|---|---|
| Pen No. | Supplements | 1 week | 3 week | 6 week | 8 week | 1 week | 3 week | 6 week | 8 week |
| 1 | 2nd hour's | 102.0 | 105.1 | 106.0 | 107.0 | 1.59 | 1.89 | 2.46 | 2.82 |
| 2 | 4th hour's | 103.0 | 105.3 | 106.2 | 106.8 | 1.59 | 1.81 | 2.40 | 2.72 |
| 3 | 6th hour's | 97.0 | 102.0 | 101.5 | 101.8 | 1.57 | 1.83 | 2.42 | 2.79 |
| 4 | 10th hour's | 95.0 | 95.3 | 94.6 | 97.1 | 1.61 | 1.84 | 2.45 | 2.80 |
| 5 | 16th hour's | 94.7 | 95.5 | 96.5 | 99.3 | 1.56 | 1.82 | 2.38 | 2.75 |
| 6 | Control (without supplement) | 100 | 100 | 100 | 100 | 1.66 | 1.89 | 2.59 | 2.98 |

Note.—100 chicks per pen were tested. Feed conversion: Represented by feed intake/weight gain.

The chicks one day old used in the tests were of $F_1$ of White Cornish ($\male$) and White Rock ($\female$). 1000 chicks consisting of 500 of $\male$ and 500 of $\female$ were divided into 3 test pens and one control pen each consisting of 250 chicks of equal numbers of the respective sexes of $\male$ and $\female$.

The main contents of the basal feeds were as follows. The basal feed I was administered for the 0 to 4th weeks and the basal feed II was administered for the 5th to 8th weeks.

|  | Crude protein, percent | Productive energy, Cal./lb. | Fish meal, percent | Other animal materials, percent | Alfalfa meal, percent |
| --- | --- | --- | --- | --- | --- |
| Basal feed I | 23 | 1,000 | 5 | 0 | 3 |
| Basal feed II | 21 | 1,040 | 4 | 0 | 3 |

Each feed further contained 0.01% furazolidone, 30 gr./t. of a tetracycline antibiotic and 11 mg./t. of $VB_{12}$ and was sufficient in nutrition. Nothing other than the feed and water was administered.

The tests were carried out until the end of the 8th week. The percentages of the body weight and total feed conversion were measured every two weeks. The results are as shown in Table 5.

TABLE 5.—FEEDING TESTS FOR BROILERS

| Pen No. | Supplement added, percent | | Weeks | | | | |
| --- | --- | --- | --- | --- | --- | --- | --- |
| | | | 0 | 2 | 4 | 6 | 8 |
| 1 | 0.1 | Body weight (g.) | 38 | 147 | 440 | 980 | 1,430 |
| | | Feed conversion | | 1.68 | 1.80 | 1.95 | 2.15 |
| 2 | 0.05 | Body weight (g.) | 38 | 146 | 435 | 978 | 1,425 |
| | | Feed conversion | | 1.68 | 1.81 | 1.96 | 2.16 |
| 3 | 0.025 | Body weight (g.) | 38 | 146 | 430 | 965 | 1,400 |
| | | Feed conversion | | 1.69 | 1.82 | 2.00 | 2.19 |
| Control | 0 | Body weight (g.) | 38 | 138 | 410 | 920 | 1,360 |
| | | Feed conversion | | 1.72 | 1.86 | 2.10 | 2.32 |

|  | Crude protein, percent | Total amount of digestible nutrients (TDN), percent | Fish meal, percent | Dairy by-products, percent | Alfalfa, percent | Antibiotics (gr./ton) | | | Acid protease* (percent) |
| --- | --- | --- | --- | --- | --- | --- | --- | --- | --- |
| | | | | | | Procaine penicillin | Dehydro- streptomycin | Tetracycline | |
| Milk replacer I | 22 | 78 | 6 | 0 | 0 | 10 | 30 | 40 | 0.2 |
| Milk replacer II | 18 | 75 | 4 | 0 | 0 | 5 | 15 | 20 | 0.1 |

*The acid protease was a preparation of 1,000 units/gr.

Example 6

0.04% by weight of a powdery supplement produced in the same manner as in Example 5 was added to a basal feed and the egg production and feed conversion of egg laying hens 10 months old were measured for 6 months The sample hens were egg laying hens of a White Leghorn series originally produced (by HL Company) in the U.S.A. and of individual capacities judged to be balanced. 1000 of them were divided into two pens, one a test pen and the other a control pen each consisting of 500 hens. The main contents of the basal feed were as follows.

Crude protein _____ percent__ 16.5
Productive energy _____ Cal./lb__ 940
Calcium _____ percent__ 3.2
Phosphorus _____ do____ 0.65
Fish meal _____ do____ 5
Alfalfa _____ do____ 3

The feed further contained 0.01% furazolidone and 20 gr./t. of a tetracycline antibiotic and was sufficient in nutrition. Nothing other than the feed and water was administered. The percentages of egg production and feed conversion per month in each pen after the start of the tests are shown in Table 6

TABLE 6.—TESTS FOR EGG LAYING HENS

| Pens | Months | | | | | |
| --- | --- | --- | --- | --- | --- | --- |
| | 1 | 2 | 3 | 4 | 5 | 6 |
| Egg production (percent): | | | | | | |
| Test pen | 88 | 86 | 83 | 79 | 76 | 74 |
| Control pen | 83 | 81 | 77 | 74 | 70 | 65 |
| Feed conversion: | | | | | | |
| Test pen | 2.23 | 2.28 | 2.37 | 2.48 | 2.58 | 2.66 |
| Control pen | 2.37 | 2.43 | 2.56 | 2.66 | 2.81 | 3.30 |

Example 7

A powdered supplement produced in the same manner as in Example 5 was added to a milk replacer for baby pigs. Baby pigs 15 days old were raised as tests for 65 days. 16 baby pigs of $F_1$ of a Landrace breed (♂) and a Yorkshire Middle White breed (♀), 15 days old, of body weights as uniform as possible and consisting of 8 baby pigs from each sow, that is, 8 ♂ and 8 ♀, were divided into a test pen and a control pen so that the sexes and body weights might be uniform.

A milk replacer I was administered to them from the 15th day to the 30th day after the birth and a milk replacer II was administered from the 31st day to the 65th day after the birth. In the test pen, 0.05% by weight of the above mentioned supplement was mixed into the milk replacer I and 0.04% by weight of the same supplement was mixed into the milk replacer II.

The main contents of the milk replacers were as follows:

Each of the milk replacers I and II contained 0.01% furazolidone, 40 gr.//t of an antibiotic and 20 mg./t of $VB_{12}$ and was sufficient in nutrition. In each pen, nothing other than the feed and water was administered.

The mean body weight and total percentage of feed conversion in each pen every 10 days after the beginning of the test are set forth in Table 7.

TABLE 7.—FEEDING TESTS FOR BABY PIGS

| Pens | Days old after birth | | | | | |
| --- | --- | --- | --- | --- | --- | --- |
| | 15 | 25 | 35 | 45 | 55 | 65 |
| Test pen: | | | | | | |
| Body weight (kg.) | 4.3 | 6.0 | 8.8 | 13.2 | 16.8 | 22.0 |
| Feed conversion | | 1.23 | 1.35 | 1.42 | 1.58 | 1.70 |
| Control pen: | | | | | | |
| Body weight (kg.) | 4.3 | 5.8 | 8.2 | 12.0 | 15.1 | 19.8 |
| Feed conversion | | 1.25 | 1.38 | 1.49 | 1.66 | 1.82 |

In the control pen, around the 35th day, 4 baby pigs suffered from a light diarrhea and were a little late in growing. But, in the test pen, the baby pigs showed no diarrhea at all and grew favorably.

Example 8

A powdered supplement produced in the same manner as in Example 5 was mixed in a feed and was administered to dairy cattle and the amount of milk and the percentage of fat were measured. The used cattle was two cows of a Holstein breed (♀). Their body weights and ages were as follows:

|  | Body weight (kg.) | Age in years old | Times of childbirth | Months after childbirth |
| --- | --- | --- | --- | --- |
| Cow a | 580 | 4 | 2 | 3–5 |
| Cow b | 650 | 5 | 3 | 4–6 |

The test period was divided into 4 periods of 2 weeks each. 0.2% of the above mentioned supplement was mixed in a feed and was administered to both cows *a* and *b* in the second and fourth periods but no supplement was administered in the first and third periods. In each test period, the first week was a preparatory period and the second week was a measuring period.

The sample feed was a formula feed for dairy cattle containing 16% crude protein and 68% TDN, and 8 kg. of it were administered to each cow per day. Each cow was freely fed with a crude feed consisting of a total of 40 kg. of grasses and corn soilages and also with rice straws per day.

The amounts of milk and the contents of fat therein of each cow in the later half (the test period) of the period in which the supplement was administered and in the later half (the control period) of the period in which the supplement was not administered were comparatively measured. The results are shown in Table 8.

TABLE 8

|  | Control period | Test period | Increase over control (percent) |
|---|---|---|---|
| Average amounts of milk produced (kg./day): |  |  |  |
| Cow *a* | 17.5 | 19.0 | +8.6 |
| Cow *b* | 18.2 | 19.5 | +7.1 |
| Contents of fat: |  |  |  |
| Cow *a* | 3.70 | 3.81 | +3.0 |
| Cow *b* | 3.38 | 3.51 | +3.8 |

What we claim is:

1. In a process for producing an animal feed supplement substantially free of growth inhibiting factors wherein a microorganism selected from the group consisting of *Bacillus subtilis* and *Bacillus natto* is cultivated in a culture medium, the improvement comprising the steps of stopping the cultivation at a point between the beginning and middle of the logarithmic growth phase of the microorganism, and heating the resulting culture at a pH of 4.0 to 8.0 and at a temperature of 50 to 80° C. for 1 to 3 hours.

2. The improvement as claimed in claim 1, wherein the cultivation is conducted as a submerged cultivation under aeration and agitation at an initial pH of 6.0 to 8.0 and at a temperature of 30 to 40° C.

3. A method of producing supplement-enriched animal feed which comprises incorporating the heat-treated culture obtained according to claim 1 into animal feed.

4. A method of producing a supplement-enriched animal feed which comprises incorporating the heat-treated culture obtained according to claim 2 into animal feed.

5. A method of producing a supplement-enriched animal feed which comprises concentrating the heat-treated culture obtained according to claim 1 and then incorporating the resulting concentrate into animal feed.

6. A method of producing a supplement-enriched animal feed which comprises concentrating the heat-treated culture obtained according to claim 2 and then incorporating the resulting concentrate into animal feed.

7. A method of producing a supplement-enriched animal feed which comprises converting the heat-treated culture obtained according to claim 1 to powder by drying, and then incorporating the resultant powder into animal feed.

8. A method of producing a supplement-enriched animal feed which comprises converting the heat-treated culture obtained according to claim 2 to powder by drying, and then incorporating the resultant powder into animal feed.

9. An animal feed supplement substantially free of growth inhibiting factors prepared by the improvement according to claim 1.

10. An animal feed containing, as additive, an animal feed supplement according to claim 9.

References Cited

UNITED STATES PATENTS

| 2,738,274 | 3/1956 | Le Mense | 99—9 |
| 2,906,622 | 9/1959 | Lewis | 99—9 |
| 2,942,977 | 6/1960 | Lewis et al. | 99—9 |

A. LOUIS MONACELL, Primary Examiner

N. ROSKIN, Assistant Examiner